United States Patent
Östergård et al.

(10) Patent No.: US 6,630,925 B1
(45) Date of Patent: Oct. 7, 2003

(54) DOUBLE-SIDED KEYBOARD HAVING TWO KEYMATS AND ONE ACTIVATION MAT

(75) Inventors: Toni Östergård, Turku (FI); Jaakko Nousiainen, Marttila (FI)

(73) Assignee: Nokia Corporation, Espoo (FI)

( * ) Notice: Subject to any disclaimer, the term of this patent is extended or adjusted under 35 U.S.C. 154(b) by 65 days.

(21) Appl. No.: 09/702,539

(22) Filed: Oct. 31, 2000

(51) Int. Cl.7 .................................. G09G 5/00
(52) U.S. Cl. ................ 345/168; 345/173; 455/550
(58) Field of Search .............. 345/168; 379/433.01; 455/90, 550

(56) References Cited

U.S. PATENT DOCUMENTS

| | | | |
|---|---|---|---|
| 3,940,758 A | * 2/1976 | Margolin | 340/337 |
| 5,715,524 A | 2/1998 | Jambhekar et al. | 455/90 |
| 5,742,894 A | 4/1998 | Jambhekar et al. | 455/90 |
| 6,038,313 A | 3/2000 | Collins | 379/433 |
| D448,032 S | * 9/2001 | Talley | D14/396 |

FOREIGN PATENT DOCUMENTS

| | | | |
|---|---|---|---|
| EP | 0156651 | 10/1995 | H01H/13/70 |
| JP | 1176615 | 7/1989 | H01H/13/70 |
| JP | 1187718 | 7/1989 | H01H/13/70 |
| WO | 9803962 | 1/1998 | G09G/3/12 |

* cited by examiner

*Primary Examiner*—Steven Saras
*Assistant Examiner*—Fritz Alphonse
(74) *Attorney, Agent, or Firm*—Ware, Fressola, Van Der Sluys & Adolphson LLP

(57) ABSTRACT

A double-sided keyboard having a first keymat and a second keymat located on two sides of a circuit board, wherein the first and second keymats share an activation mat located between the first keymat and the circuit board. The first keymat has a plurality of keys, and the second keymat has a plurality of keys so that any key can be used to activate the circuit board through the same activation mat. The double-sided keyboard can be used on the cover of an electronic device so that the first keymat is used to enter information in the electronic device when the cover is closed and the second keymat is used when the cover is open. Preferably, the activation mat has a plurality of dome-shaped, electrically conducted sections which make contact with the circuit board when one of the keys is pressed.

20 Claims, 10 Drawing Sheets

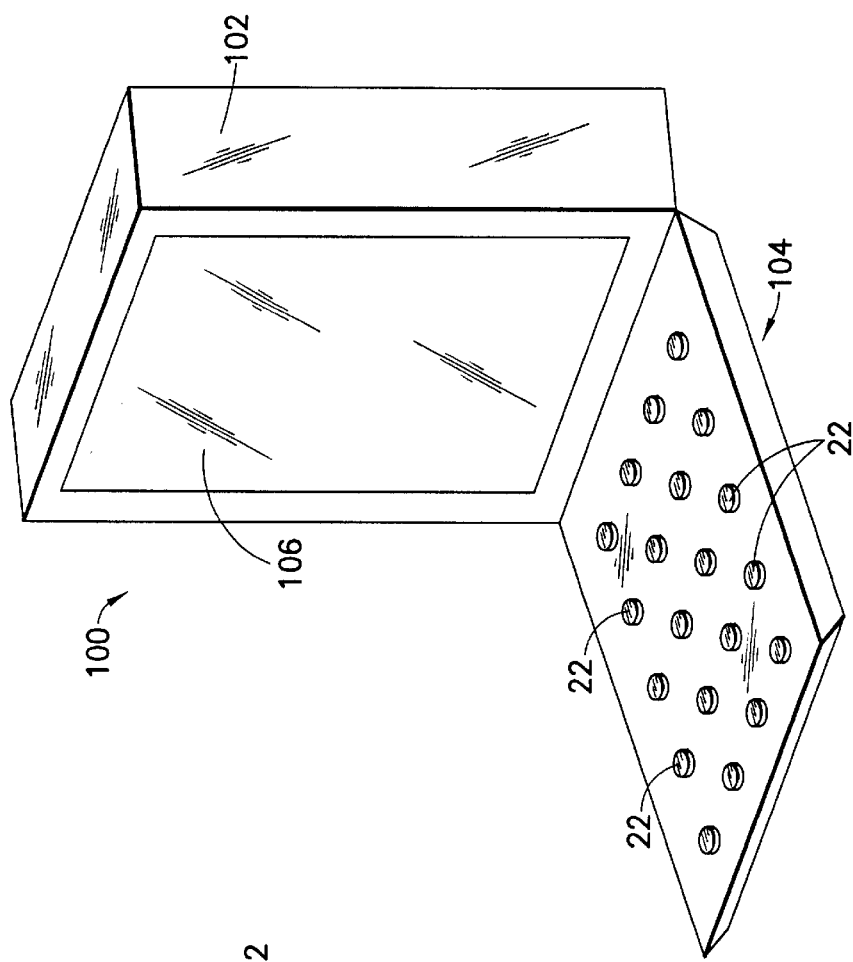
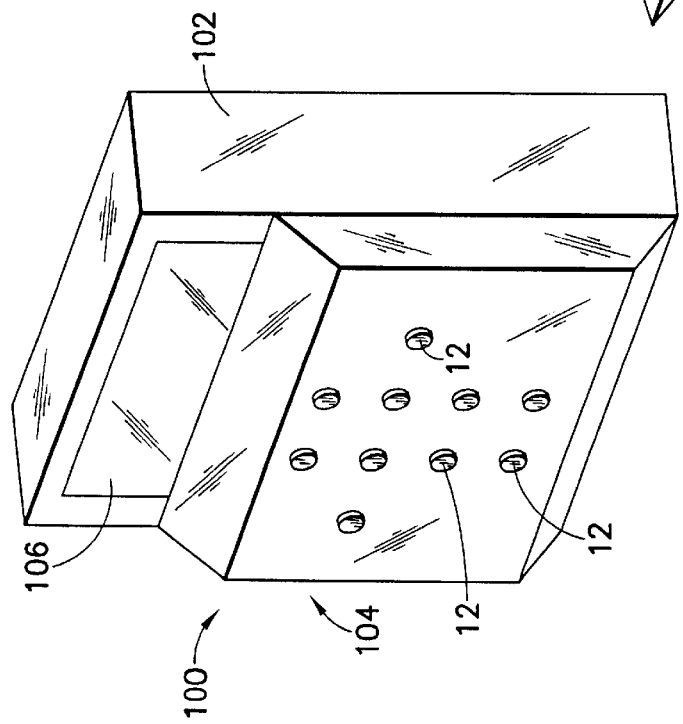
FIG. 1b
FIG. 1a

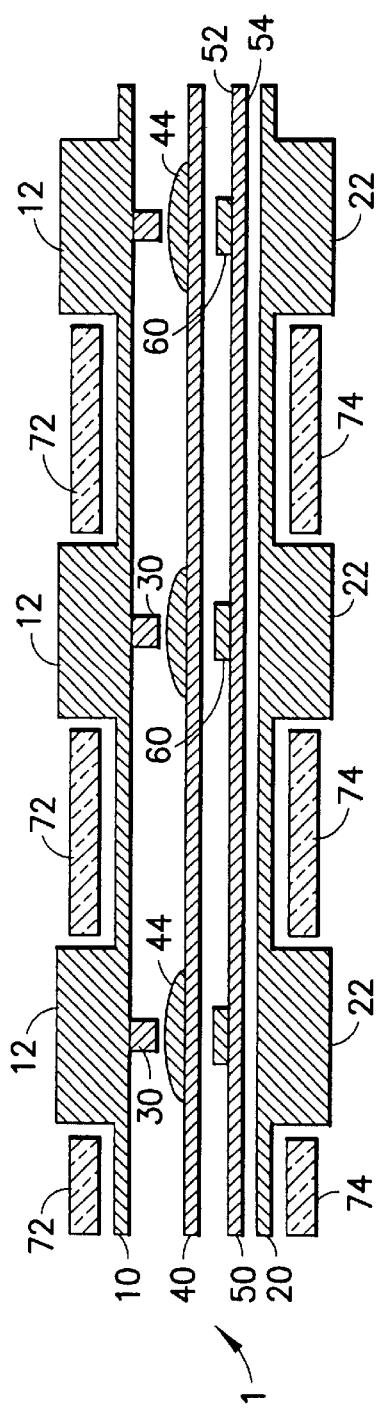
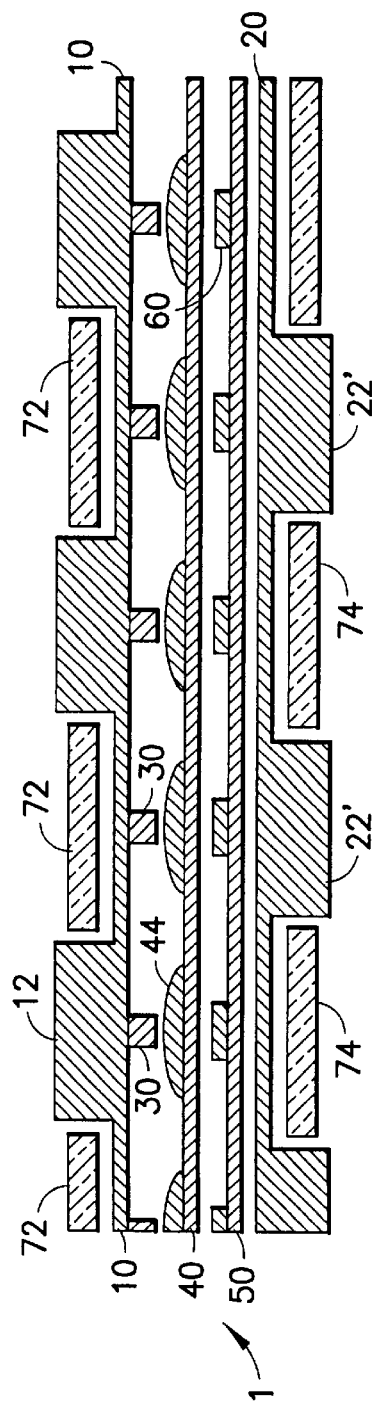
FIG.3a
FIG.3b

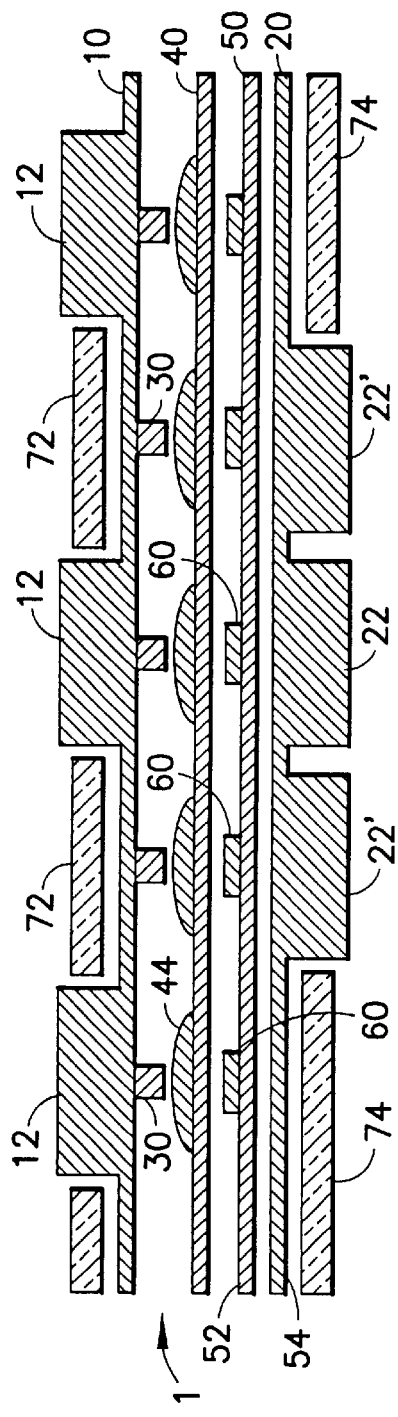
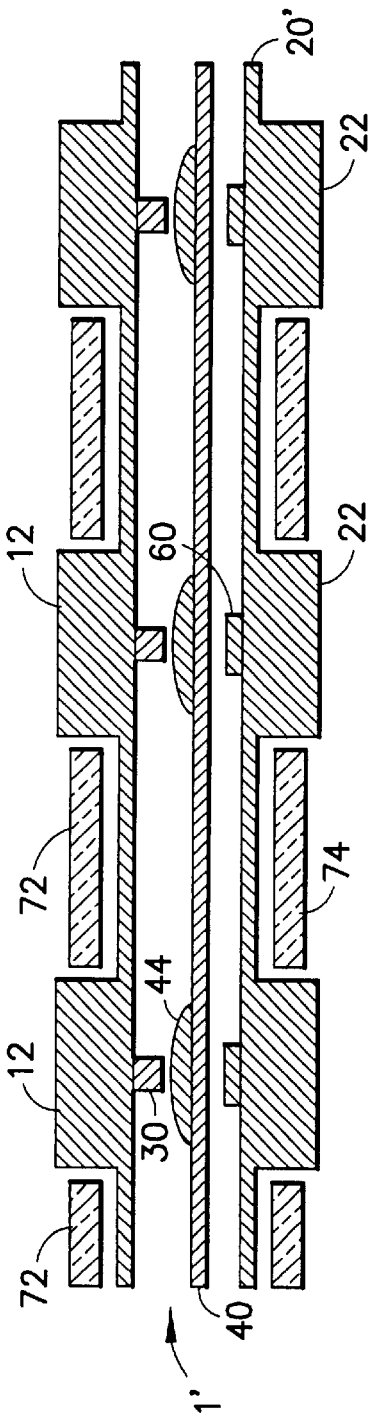
FIG.3c
FIG.3d

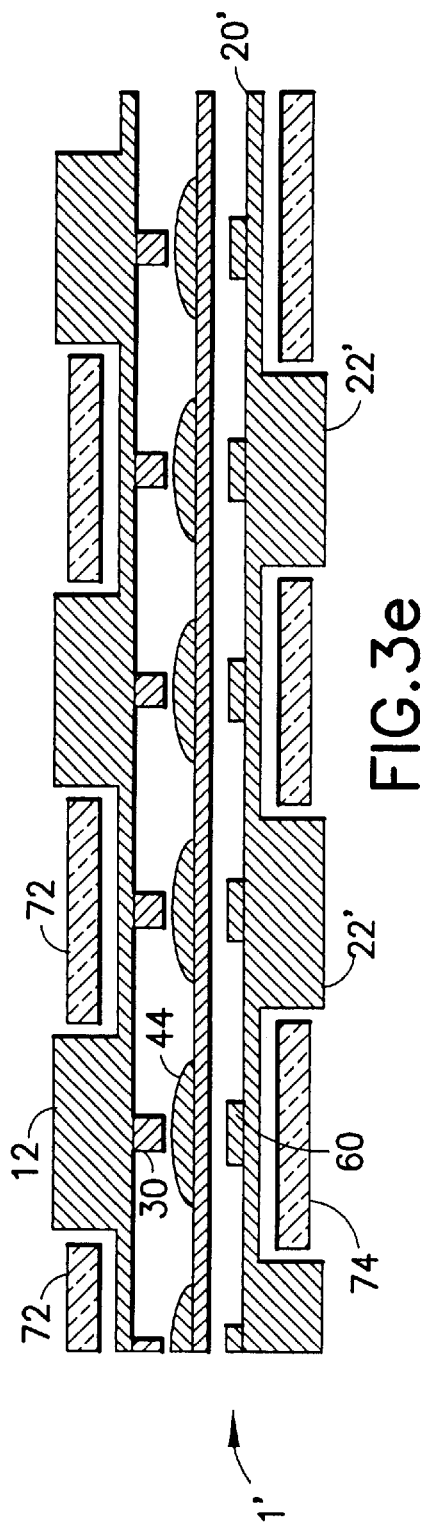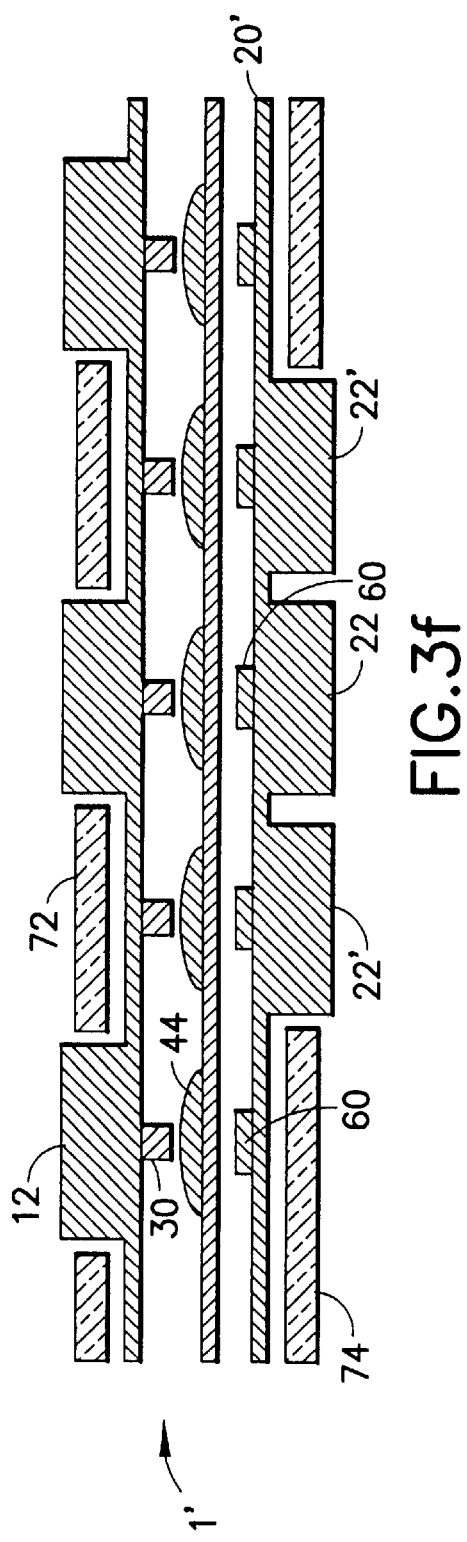

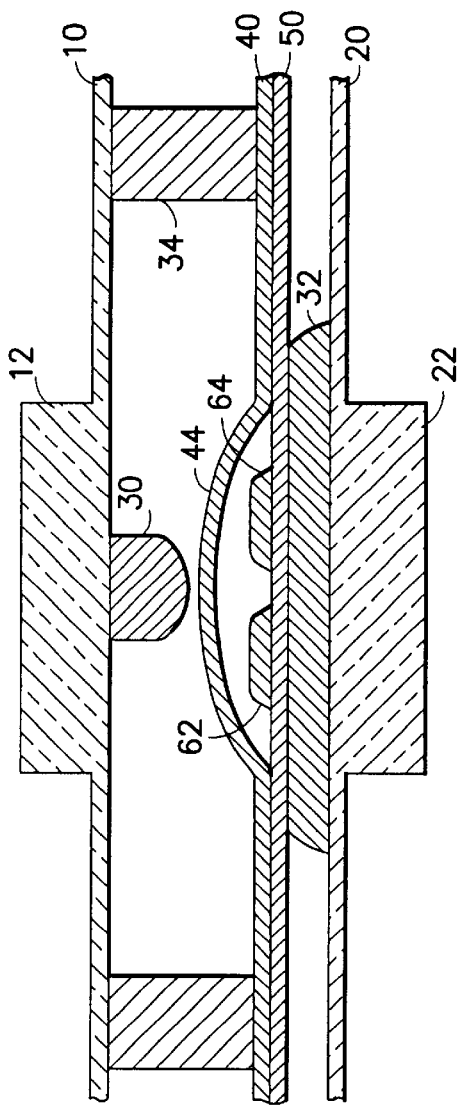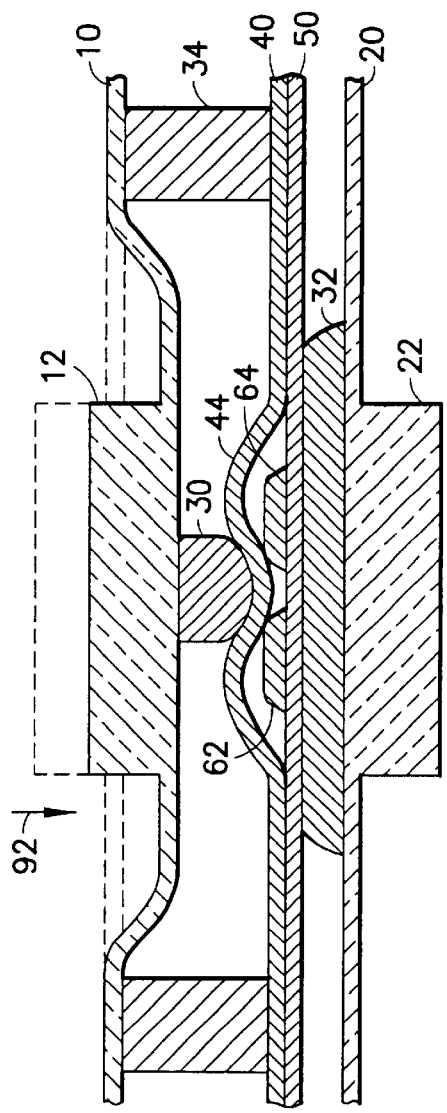

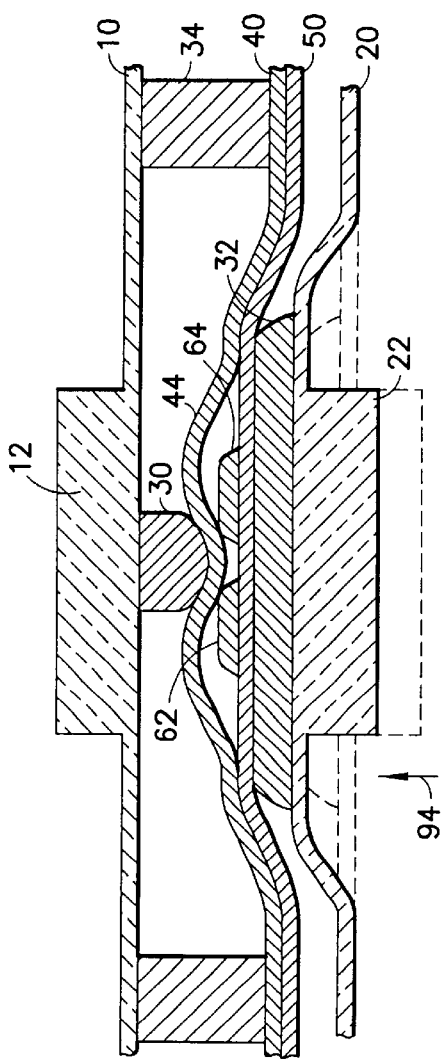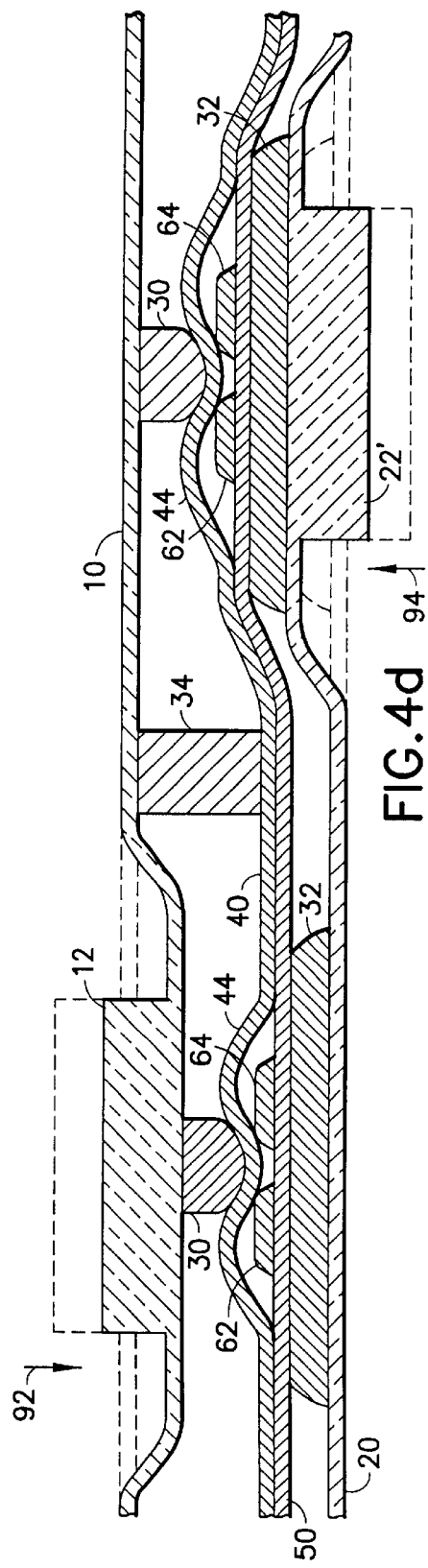

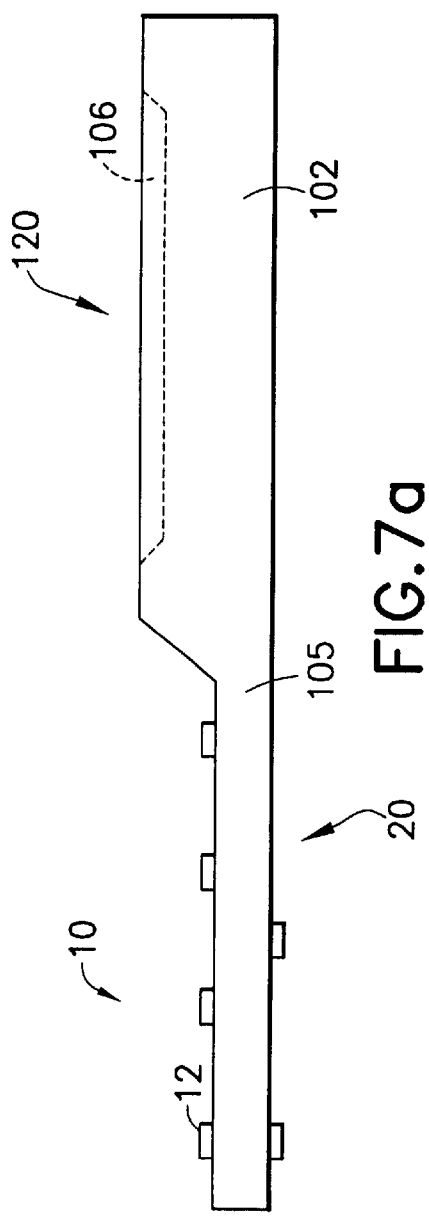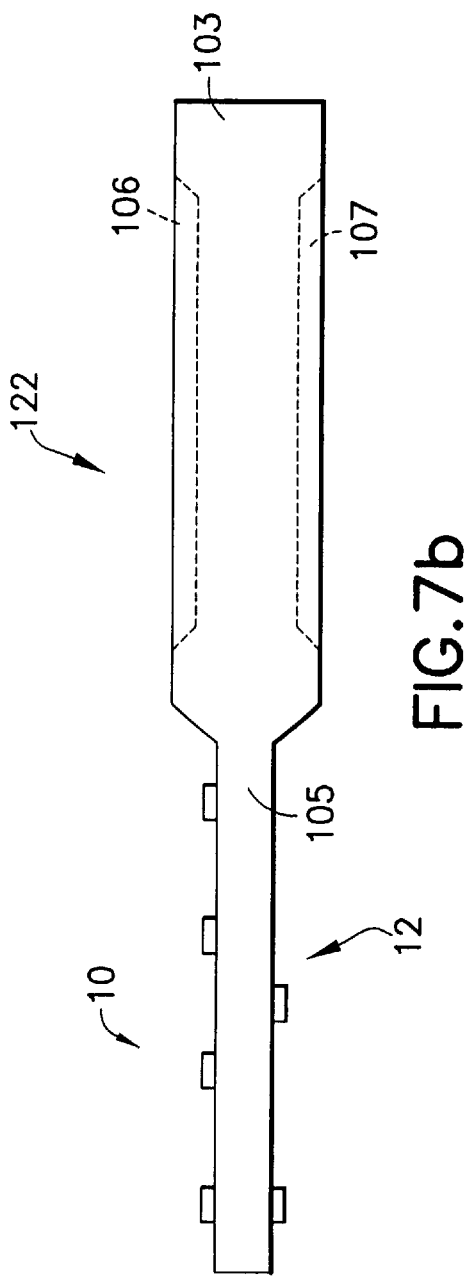

DOUBLE-SIDED KEYBOARD HAVING TWO KEYMATS AND ONE ACTIVATION MAT

FIELD OF THE INVENTION

The present invention relates generally to a keyboard in an electronic device and, more particularly, to a double-sided keyboard having two keymats, or two sets of individual keys, located on both sides of the keyboard for entering information into an electronic device.

BACKGROUND OF THE INVENTION

Man-machine interaction, in terms of user input, is of utmost importance in portable communication devices. Splitting up one single keyboard into two or more sub-keyboards is one of the ways to improve the efficient use of a communication device. For example, in a Nokia Communicator, the phone keyboard is used when the Communicator functions as a telephone and another separate QWERTY keyboard is used when the Communicator is used for other functions. As portable communication devices become smaller and more compact, the available space and volume for two or more sub-keyboards becomes more limited. One way to solve this limited space problem is to implement two keyboards on the two sides of the phone cover, which is also known as an active flip, or on the opposite sides of the device itself. Conventionally, each of the two keyboards on the same active flip, or the device itself, has a separate circuit board to allow the keys on each keyboard to enter information through their own activation devices on the respective circuit board. This type of double-sided keyboard is disclosed, for example, in U.S. Pat. No. 6,038,313 (Collins). Although this type of double-sided keyboard arrangement can save space, it is costly to produce. U.S. Pat. Nos. 5,715,524 and 5,742,894 (Jambhekar et al.) disclose a radio communication device, wherein a touch screen display is used to enter information when the device is in an opened position, and a depressible keypad is used when the device is in a closed position. When the device is in the closed position, part of the touch screen display is concealed behind the depressible keypad. The keys on the depressible keypad use the concealed portion of the touch screen display to enter information. While this type of multiple keyboard can save space and cost, it is only applicable for those devices that have a touch screen display.

It is desirable to provide a cost-effective method and apparatus for entering information using different keys on different sub-keyboards without the need of a touch screen display.

SUMMARY OF THE INVENTION

The first aspect of the present invention is a double-sided keyboard for entering information in an electronic device. The keyboard comprises:

a circuit board having a first side and an opposing second side;

a first keymat having a first plurality of keys located on the first side;

a second keymat having a second plurality of keys located on the second side; and an activation mat having a plurality of activation sections located between the first keymat and the circuit board so as to allow the first and second keymats to activate the circuit board by pressing at least one of the keys in order to cause at least one of the electrically conductive sections to operatively engage with the circuit board for providing a signal indicative of the information for use in the electronic device.

Preferably, the circuit board includes a plurality of connection areas, and the activation sections include a plurality of dome-shaped contact pads, each of which is electrically conductive and located above one of the electrical connection areas, such that the signal is provided to the circuit board in response to the depressing of one of the keys, causing one of the contact pads to make contact with the respective connection area.

It is possible that some of the first plurality of keys share the same contact pads with some of the second plurality of keys.

It is possible that some of first plurality of keys and some of the second plurality of keys have their own contact pads.

It is possible to integrate part of the circuit board into the second keymat such that the connection areas are located on the second keymat and underneath the dome-shape contact pads.

It is possible that the connection areas include pressure sensing elements such that the signal is provided to the circuit board in response to depressing one of the keys, causing one of the activation sections to apply pressure to the respective connection area.

It is possible that the connection areas include capacitive sensing elements such that the signal is provided to the circuit board in response to depressing one of the keys, causing one of the action sections to affect the capacitance of the respective connection area.

When the electronic device has an active flip, it is preferable to implement the keyboard on the active flip such that the first plurality of keys can be accessed from one side of the active flip and the second plurality of keys can be accessed from the other side of the active flip.

Alternatively, the keyboard can be implemented on the body of the electronic device such that the first plurality of keys can be accessed from one side of the device body and the second plurality of keys can be accessed from the other side of the device body.

The second aspect of the present invention is a method of producing a double-sided keyboard for entering information in an electronic device. The method comprises the steps of:

providing a circuit board having a first side and an opposing second side;

providing an activation mat having a plurality of activation sections adjacent the first side of the keyboard;

providing a first keymat having a first plurality of keys adjacent the activation mat;

providing a second keymat having a second plurality of keys adjacent the second side of the keyboard so as to allow the first and second keymats to activate the circuit board by pressing at least one of the keys in order to cause at least one activation section to operatively connect to the circuit board for providing a signal indicative of the information for use in the electronic device.

The third aspect of the invention is a method of entering and using information in an electronic device. The method comprises the steps of:

pressing at least one of a first plurality of keys of a first keymat situated adjacent to a first side of an activation mat having a plurality of electrically conductive sections in order to cause at least one electrically conductive section of the activation mat to operatively connect to a circuit board having a first side and an opposing second side, wherein the first side of the circuit board situated adjacent a second side of the activation mat opposing the first side thereof, for providing a first signal, or pressing at least one of a second plurality of keys situated adjacent to the second side of the circuit board in order to cause at least one electrically conductive section of the activation mat to operatively connect to the circuit board, for providing a second signal; and using either the first signal or the second signal for performing a function related thereof in the electronic device.

The present invention will become apparent upon reading the description taken in conjunction with FIGS. 1a to 7b.

BRIEF DESCRIPTION OF THE DRAWINGS

FIG. 1a is a diagrammatic representation illustrating a portable electronic device having a keymat on its cover.

FIG. 1b is a diagrammatic representation illustrating the same electronic device with the cover being opened to expose another keymat.

FIG. 3a is a cross sectional view illustrating the double-sided keyboard of the present invention, wherein the keys on the two keymats share the same activation devices in order to activate the circuit board.

FIG. 3b is a cross sectional view illustrating the double-side keyboard, wherein the keys on the two keymats use different activation devices to active the circuit board.

FIG. 3c is a cross sectional view illustrating the double-side keyboard, wherein some keys on the two keymats use the same activation devices but some keys use different activation devices to activate the circuit board.

FIG. 3d is a cross sectional view illustrating the double-sided keyboard of the present invention, wherein the keys on the two keymats share the same activation devices in order to activate a connection area integrated into one of the keymats.

FIG. 3e is a cross sectional view illustrating the double-sided keyboard, wherein the keys on the two keymats use different activation devices to activate a connection area integrated into one of the keymats.

FIG. 3f is a cross sectional view illustrating the double-sided keyboard, wherein some keys on the two keymats use the same activation devices but some keys use different activation devices to activate a connection area integrated into one of the keymats.

FIG. 4a is a cross sectional view illustrating two keys, which share a common activation device.

FIG. 4b is a cross sectional view illustrating the activation of the circuit board by pressing the key on the first keymat, wherein the keys on the two keymats share the same activation devices.

FIG. 4c is a cross sectional view illustrating the activation of the circuit board by pressing the key on the second keymat, wherein the keys on the two keymats share the same activation devices.

FIG. 4d is a cross sectional view illustrating the activation of the circuit board by pressing a key on either the first or second keymat, wherein the keys on the two keymats use different activation devices.

FIG. 7a is a diagrammatic representation of an electronic device having a keyboard as an extended portion of the electronic device.

FIG. 7b is a diagrammatic representation of another electronic device having a keyboard as an extended portion of the electronic device.

DETAILED DESCRIPTION OF THE INVENTION

Figure 2B:
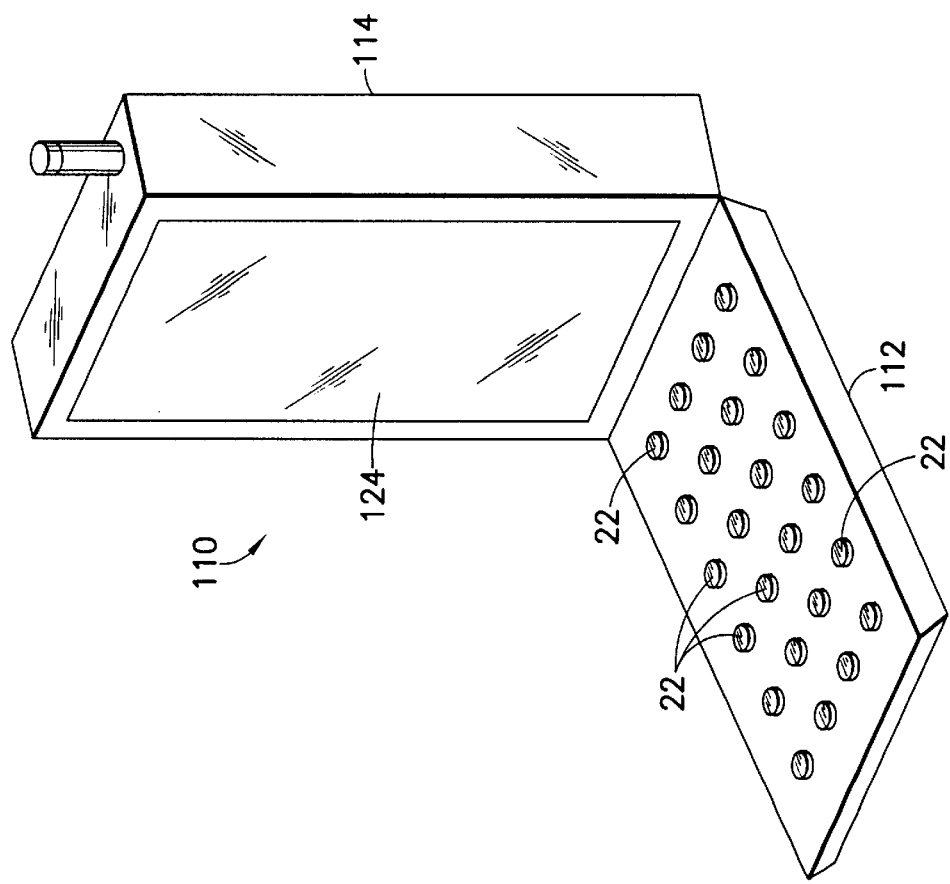
FIG. 2b is a diagrammatic representation illustrating the same communication device with the cover being opened to expose another keymat.

FIGS. 1a and 1b illustrate a portable electronic device 100, such as a personal digital assistant, which has a device body 102 and a cover 104. When the cover 104 is in a closed position, it exposes a set of first keys 12, as shown in FIG. 1a. When the cover 104 is in an open position, it exposes a different set of second keys 22, as shown in FIG. 1b. The device body 102 has a display 106 to show information to the user. It is understood that the cover 104 is electrically connected to the device body 102 for allowing the keys 12 and 22 to provide signals to the device body 102 for use in the device 100.

Figure 2A:
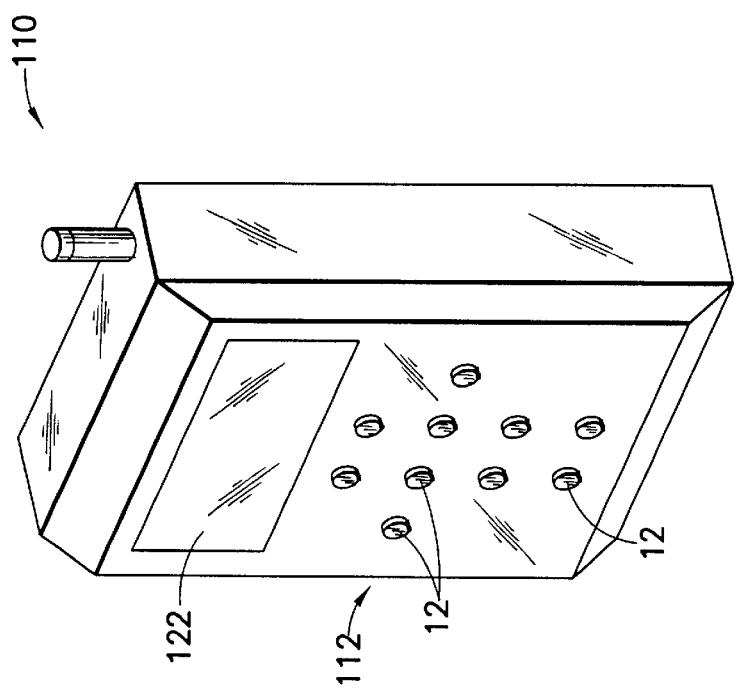
FIG. 2a is a diagrammatic representation illustrating a communication device having a keymat on its cover.

FIGS. 2a and 2b illustrate a communication device 110, such as a Nokia Communicator, which includes a phone keyboard or keymat having a plurality of first keys 12, and a larger keyboard or keymat, such as a QWERTY keyboard, having a plurality of second keys 22. The communication device 110 has a display 122 to be used as a phone display when the cover 112 is in a closed position, as shown in FIG. 2a. The communication device 110 also has another display 124 on the device body 114 to be used when the cover 112 is an open position, as shown in FIG. 2b. It is understood that the cover is 112 is electrically connected to the device body 114 for allowing the keys 12 and 22 to provide signals to the device body 114 for use in the device 110.

As shown in FIGS. 1a to 2b, the first keys 12 and the second keys 22 are located on different sides of the cover. Preferably, the key functions of the first keys 12 are different from the key functions of the second keys 22. For example, the first keys 12 include number keys 0 to 9, a star key (*), and a pound sign (#), and the second keys 22 include alphabetic keys. However, it is also possible that some or all of the first keys 12 have the same key functions as those of the corresponding second keys 22.

FIGS. 3a–3c are cross sectional views of the double-sided keyboard 1 of the present invention, which can be used on the cover 104 of the electronic device 100, as shown in FIGS. 1a and 1b, or the cover 112 of the communication device 110, as shown in FIGS. 2a and 2b. As shown in FIGS. 3a–3c, the double-sided keyboard 1 includes a circuit board 50 having a first side 52 and an opposing second side 54. Preferably, the circuit board 50 is a flexible printed circuit board (PCB), or a flexible connector arrangement, having electrical connection pads 60 for reading the key input on the first side 52. Flexible connector arrangement and electrical connection pads 60 are well known in the art and are not part of the present invention. On the first side 52 of the circuit board 50, an activation mat 40, having a plurality of dome-shaped, electrically conductive pads 44, is provided to make electrical contact with the electrical connection pads 60 on the circuit board 50 so as to produce electrical signals. As shown in FIGS. 3a–3c, a first keymat 10 having a plurality of first keys 12 is provided on top of the activation mat 40. An actuator 30 is provided under each first key 12 so that when the first key 12 is pressed towards the circuit board 50, the corresponding dome-shaped, electrically conductive contact pad 44 is depressed by the actuator 30, causing the contact pad 44 to make electrical contact with the corresponding electrical connection pad 60 (See FIG. 4b, where the electrical connection pad is represented by terminals 62, 64). Optionally, a mat cover 72 is provided over the first keymat to physically isolate one first key 12 from another. Furthermore, a second keymat 20 having a plurality of second keys 22 is placed adjacent to the second side 54 of the circuit board 50 so that when a second key 22 is pressed towards the circuit board 50, the dome-shaped, electrically conductive contact pad 44 is depressed by a corresponding actuator 30, causing the contact pad 44 to make electrical contact with the corresponding electrical connection pad 60 (See FIG. 4c, where the electrical connection pad is represented by terminals 62, 64). Moreover, a mat cover 74 is provided over the second keymat 20 to physically isolate one second key 22 from another. Preferably, one or both of the mat covers 72 and 74 can also serve as a mechanical support to the whole keyboard arrangement, especially if individualy keys 12 are used instead of the keymats 10 and 20.

FIG. 3a shows a double-side keyboard 1, wherein the first keys 12 share the same dome-shaped, electrically conductive contact pads 44 with the corresponding second keys 22. FIG. 3b shows a double-sided keyboard 1, wherein the first keys 12 use different dome-shaped, electrically conductive contact pads 44 from the second keys 22'. FIG. 3c shows a double-sided keyboard 1, wherein some of the second keys 22 of the second keymat 20 share the same conductive pads 44 with the first keys 12 of the first keymat 10, and some of the second keys 22' use separate conductive pads 44.

FIGS. 3d–3f are cross sectional views of the double-sided keyboard 1' of the present invention, which can be used on the cover 104 of the electronic device 100, as shown in FIGS. 1a and 1b, or the cover 112 of the communication device 110, as shown in FIGS. 2a and 2b. The double-sided keyboard 1' is essentially the same as the double-sided keyboard 1, as shown in FIGS. 3a–3c, except that the electrical connection pad 60 (See FIG. 4c, where the electrical connection pad is represented by terminals 62, 64) and the necessary connection circuitry are integrated to the second keymat 20. Thus, the second keymat 20 also functions as a keyboard similar to the keyboard 50 as shown in FIGS. 3a–3c.

FIGS. 4a to 4c are cross sectional views illustrating the activation of the circuit board by pressing a key on either the first or the second keymat, wherein the keys on the two keymats share the same activation devices. For illustrative purposes, the connection pad 60 on the circuit board 50 is represented by two conductive terminals 62, 64 provided under each dome-shaped, electrically conductive contact pad 44. It is preferred that a base support 32 is provided between the second key 22 and the circuit board 50 in the area around the terminals 62, 64. When the contact pad 44 is remote from the terminals 62, 64, as shown in FIG. 4a, the terminals 62, 64 act like an open switch. When the first key 12 is pressed towards the circuit board 50 along a direction denoted by an arrow 92 from its original position shown in phantom, the actuator 30 depresses the dome-shaped, electrically conductive contact pad 44 into contact with the terminals 62, 64, as shown in FIG. 4b. The terminals 62, 64 act like a closed switch, wherein the terminals 62, 64 are electrically connected. FIG. 4c shows that the terminals 62, 64 can also be electrically connected when the second key 22 is pressed toward the circuit board 50 along a direction denoted by an arrow 94 from its original position, shown in phantom. As shown in FIG. 4c, as the second key 22 is pressed along the direction 94, the base support 32 distorts the flexible circuit board 50. The distorted circuit board 50, in turn, pushes the activation mat 40 towards the first keymat 10, depressing the dome-shaped, contact pad 44 into contact with the terminals 62, 64.

FIG. 4d illustrates the activation of the circuit board 50 by pressing either a first key 12 on the first keymat 10 or a second key 22' on the second keymat 20, wherein the keys 12, 22' use different contact pads 44.

In order to physically isolate the action of one dome-shaped contact pad 44 from another, it is possible to provide a plurality of spacers 34, as shown in FIGS. 4a–4d.

Figure 5:
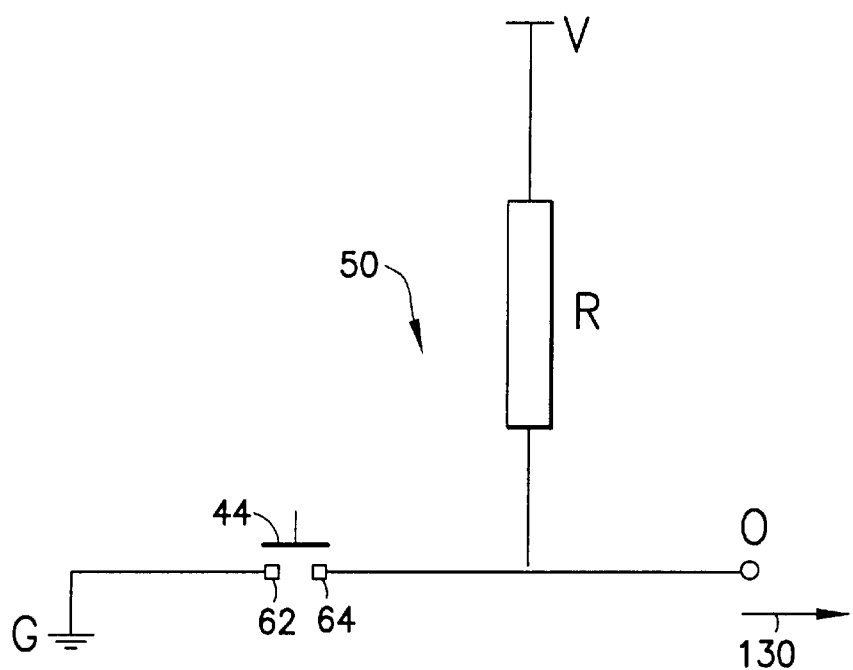
FIG. 5 is a schematic diagram illustrating the principle of activating the circuit board.

FIG. 5 is a schematic diagram illustrating the principle of activating the circuit board 50 involving the terminals 62, 64. As shown, the terminals 62, 64 act like a switch, which can be closed with the electrically conductive contact 44. For example, the terminal 62 is connected to the electrical ground G and the terminal 64 is connected to an output terminal O, which is connected to a voltage source having a voltage level V through a resistor R. When the terminals 62, 64 are not shorted by the contact 44, the voltage at the output terminal O is equal to or slightly lower than V. However, when the terminals 62, 64 are electrically connected to each other by the contact 44, the output terminal O is electrically grounded. Thus, when the contact 44 is caused to make contact with the terminals 62, 64, it provides a signal 130 indicative of the voltage change at the output terminal O.

Figure 6A:
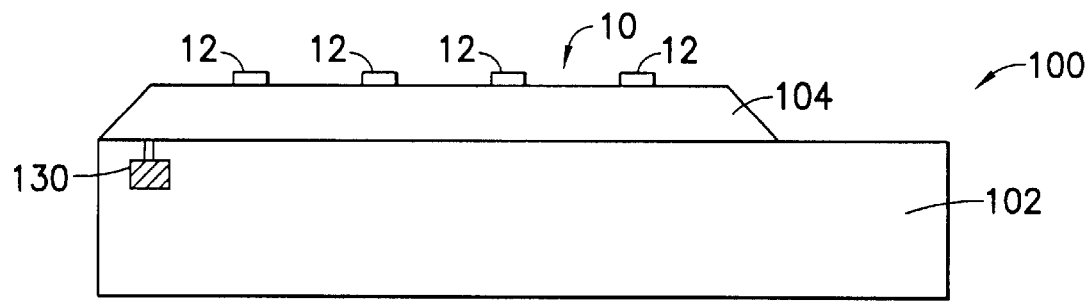
FIG. 6a is a diagrammatic representation of an electronic device having a switching mechanism to define a keyboard mode when the cover is closed.
Figure 6B:
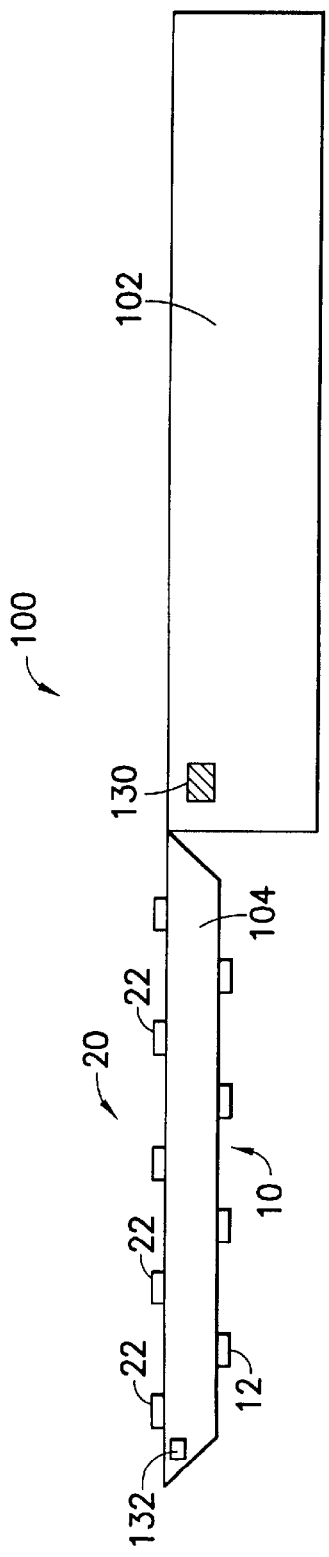
FIG. 6b is a diagrammatic representation of the same electronic device as illustrated in FIG. 6a, wherein the switching mechanism defines another keyboard mode when the cover is open.

It should be noted that, as shown in FIGS. 3a–3c and 4a–4d, the connector arrangement on the circuit board 50 is shared by both the first keymat 10 and the second keymat 20, but it is preferred that the key functions of the keymat 10 and the keymat 20 are not the same. Because the same activation mat 40, or the like, can be pressed on either side thereof, the electronic circuitry in the electronic device that uses the keyboard 1 should be able to recognize which one of the keymats 10, 12 is being used. As shown in FIG. 6a, it is possible to install in the electronic device 100 a contact switch 130, which is operatively connected to the cover 104 and the device body 102. The switch 130 is operable at two different states (open and closed, for example) such that when the cover 104 is closed, as shown in FIGS. 1a and 6a, the keyboard 1 (FIGS. 3a–4d) functions in accordance with the input from the first keys 12 of the first keymat 10. However, when the cover 104 is open, as shown in FIGS. 1b and 6b, the keyboard 1 functions in accordance with the input from second keys 22 of the second keymat 20. It is well known that a mobile phone that has a phone cover uses an active flip or the like to connect and disconnect a phone call. A similar device can be used for the switch 130.

Figure 6C:
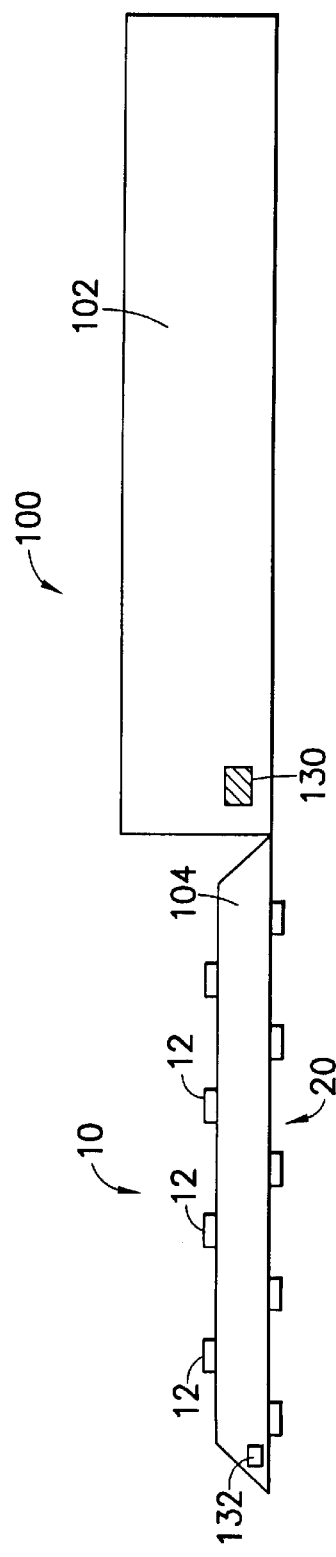
FIG. 6c is a diagrammatic representation of the same electronic device as illustrated in FIG. 6a, wherein a directional switch is used to further define the keyboard modes.

It is also possible to install on the cover 104 a device 132 similar to a tilt switch or a gravity-sensitive switch, as shown in FIGS. 6b and 6c, which can sense the direction of the cover 104 regarding the gravity. With such a switch, the keyboard 1 can function differently when the first keymat 10 is facing upward as opposed to when the second keymat 20 is facing upward. It is possible to choose the active side by user selection.

If different detection areas are used for the first side and the second side, the pressed side and the key are clearly defined.

In FIGS. 1a, 1b, 6a–6c, the double-sided keyboard 1 or 1' is implemented on a cover of an electronic device. It is possible that the double-sided keyboard 1 or 1' is a non-movable part of an electronic device 120 or 122, as shown in FIGS. 7a and 7b. As shown in FIG. 7a, the double-sided keyboard is an extended portion 105 of the device body 102 of the electronic device 120, which includes a display 106. As shown in FIG. 7b, the double-sided keyboard is an extended portion 105 of the device body 103 of the electronic device 122, which has two displays 106 and 107 corresponding to the keymats 10 and 12.

It should be noted that, as shown in FIGS. 4a–5, the dome-shaped contact pad 44 is electrically conductive so that when the contact pad 44 makes contact with the terminals 62, 64, it electrically connects the terminals. However, it is not necessary for the contact pad 44 to be electrically conductive and for it to physically make contact with the terminals 62, 64 in order to activate the circuit board 50. For example, the contact pad 44 can be a poor electric conductor but it can cause a change in the capacitance between the terminals 62, 64 when it is in close proximity to the terminals 62, 64. This capacitance change can, in turn, cause a frequency change in a signal or other electrical characteristics of the signal in the circuit board 50. The activation mat 40 can be made of a variety of materials. For example, it can be made of a non-conductive material and then made conductive by a flexible metal coating; it can be made from an inherently conductive polymer membrane such as polyacetylene; or it can be made of a polymer matrix embedded with a conductive filler, such as carbon or other metallic particles. It is also possible that only the underside of the dome-shaped contact pad 44 is made conductive by having a flexible, conductive epoxy adhesive provided thereon, while the rest of the activation mat 40 is electrically non-conductive. Furthermore, the resistor R in FIG. 5 can be the same in all keys 12, 22, but it can be different in different keys.

Thus, although the invention has been described with respect to a preferred embodiment thereof, it will be understood by those skilled in the art that the foregoing and various other changes, omissions and deviations in the form and detail thereof may be made without departing from the spirit and scope of this invention.

What is claimed is:

1. A double-sided keyboard for entering information in an electronic device, comprising:

a circuit board having a first side and an opposing second side with electrically conductive segments on the first side;

a first keymat disposed adjacent to the first side of the circuit board, the first keymat having a plurality of first keys;

a second keymat disposed adjacent to the second side of the circuit board, the second keymat having a plurality of second keys; and an activation mat located between the first keymat and the circuit board, the activation mat having a plurality of electrically conductive sections facing the electrically conductive segments on the first side of the circuit board, so as to allow the first and second keymats to activate the circuit board by pressing at least one of the first and second keys, thereby causing at least one of the electrically conductive sections facing the electrically conductive segments on the first side of the circuit board to make electrical contact only with part of the electrically conductive segments on the first side of the circuit board for providing a signal indicative of the information for use in the electronic device.

2. The keyboard of claim 1, wherein the circuit board is integrated into the second keymat.

3. The keyboard of claim 1, further comprising a mat cover adjacent to the first keymat away from the first side of the circuit board for separating the first plurality of keys.

4. The keyboard of claim 1, further comprising a mat cover adjacent to the second keymat away from the second side of the circuit board for separating the second plurality of keys.

5. The keyboard of claim 1, wherein the electrically conductive sections comprise a plurality of dome-shaped segments for making electrical contact with the circuit board to activate the circuit board.

6. The keyboard of claim 5, wherein the dome-shaped segments are shared with the first and second plurality of keys such that each dome-shaped segment can be caused to make electrical contact with the circuit board by either one of the first plurality of keys or one of the second plurality of keys.

7. The keyboard of claim 1, wherein the electrically conductive sections comprise:

a first plurality of dome-shaped segments for making electrical contact with the circuit board to activate the circuit board by pressing one of the first plurality of keys; and a second plurality of dome-shaped segments for making electrical contact with the circuit board to activate the circuit board by pressing one of the second plurality of keys.

8. The keyboard of claim 1, wherein the first keymat is capable of activating the circuit board only when the keyboard is oriented in a first direction, and the second keymat is capable of activating the circuit board only when the keyboard is oriented in a second direction different from the first direction.

9. The keyboard of claim 8, further comprising a mechanism, operatively connected to the circuit board, for determining whether the keyboard is oriented in the first or second direction and for providing a further signal indicative of the orientation direction for use in the electronic device.

10. The keyboard of claim 8, wherein the first keymat is positioned above the circuit board when the keyboard is oriented in the first direction.

11. The keyboard of claim 8, wherein the second keymat is positioned above the circuit board when the keyboard is oriented in the second direction.

12. The keyboard of claim 1, wherein the electronic device includes:

a movable cover for implementing said keyboard, and a device body mechanically and electrically connected to the movable cover for allowing the circuit board to convey the signal from the cover to the device body.

13. The keyboard of claim 1, wherein the electronic device includes:

a device body, and an extended portion for implementing said keyboard, wherein the device body is electrically connected to the extended portion for allowing the circuit board to convey the signal from the extended portion to the device body.

14. A method of producing a double-sided keyboard for entering information in an electronic device, comprising the steps of:

providing a circuit board having a first side and an opposing second side with electrically conductive segments on the first side;

providing an activation mat adjacent to the first side of the circuit board, the activation mat having a plurality of electrically conductive sections facing the electrically conductive segments on the first side of the circuit board;

providing a first keymat adjacent the activation mat further from the first side of the circuit board, the first keymat having a plurality of the first keys; and providing a second keymat adjacent to the second side of the circuit board, the second keymat having a plurality of second keys, so as to allow the first and second keymats to activate the circuit board by pressing at least one of the first and second keys, thereby causing at least one of the electrically conductive sections on the activation mat facing the electrically conductive segments on the first side of the circuit board to make electrical contact only with part of the electrically conductive segments on the first side of the circuit board for providing a signal indicative of the information for use in the electronic device.

15. The method of claim 14, wherein the first keymat is capable of activating the circuit board only when the keyboard is oriented in a first direction and the second keymat is capable of activating the circuit board only when the keyboard is oriented in a second direction.

16. The method of claim 15, further comprising the step of providing a mechanism, operatively connected to the circuit board, for determining whether the keyboard is oriented in the first or the second direction and for providing a further signal indicative of the orientation direction for use in the electronic device.

17. The method of claim 14, wherein the electrically conductive sections include a plurality of dome-shaped segments for making electrical contact with the circuit board to activate the circuit board by pressing at least one of the first or the second plurality of keys.

18. The method of claim 14, wherein the electrically conductive sections include:

a plurality of first dome-shaped segments for making electrical contact with the circuit board to activate the circuit board by pressing at least one of the first plurality of keys, and a plurality of second dome-shaped segments for making electrical contact with the circuit board to activate the circuit board by pressing at least one of the second plurality of keys.

19. The method of claim 14, wherein the second keymat is an integral part of the circuit board.

20. A method of entering and using information in an electronic device, comprising the steps of:

pressing at least one of a first plurality of keys of a first keymat situated adjacent to a first side of an activation mat having a plurality of electrically conductive sections in order to cause at least one of the electrically conductive sections of the activation mat to operatively connect to a circuit board having a first side and an opposing second side, wherein the first side of the circuit board is situated adjacent a second side of the activation mat opposing the first side thereof, for providing a first signal, or pressing at least one of a second plurality of keys situated adjacent to the second side of the circuit board in order to cause at least one electrically conductive section of the activation mat to operatively connect to the first side of the circuit board, for providing a second signal; and using either the first signal or the second signal for performing a function related thereof in the electronic device.

\* \* \* \* \*